UNITED STATES PATENT OFFICE.

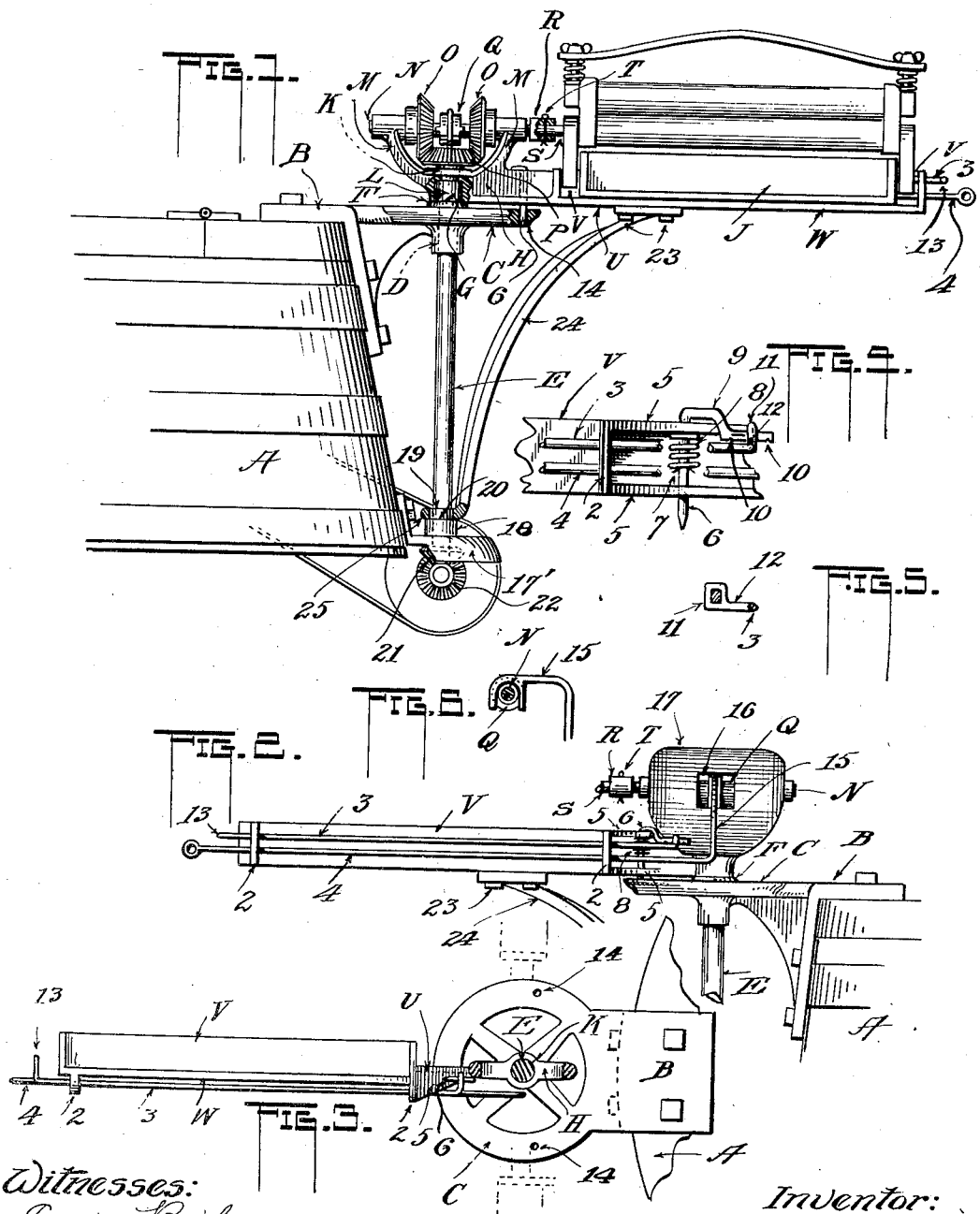

MATHIAS PALUSKA, JR., OF ROANOKE, ILLINOIS, ASSIGNOR, BY MESNE ASSIGNMENTS, TO GETZ POWER WASHER CO., OF MORTON, ILLINOIS, A CORPORATION OF ILLINOIS.

WRINGER SUPPORT AND GEARING.

1,259,899.  Specification of Letters Patent.  Patented Mar. 19, 1918.

Application filed May 26, 1913.  Serial No. 769,960.

*To all whom it may concern:*

Be it known that I, MATHIAS PALUSKA, Jr., citizen of the United States, residing at Roanoke, in the county of Woodford and State of Illinois, have invented certain new and useful Improvements in Wringer Supports and Gearing; and I do hereby declare that the following is a full, clear, and exact description of the invention, which will enable others skilled in the art to which it appertains to make and use the same.

This invention relates to mechanism for supporting a wringer, and gearing carried by the support for driving said wringer.

The object of the invention is to provide a simple and compact supporting structure for a wringer for attachment to a wash tub making the entire device portable with the tub.

Another object is to provide a clutch for certain driving gears, and means for fixing the wringer on the support in any desired adjustment with relation to the tub, the controlling means being carried on a part of the support within convenient reach of the operator.

Another object of the invention is to construct a simple and compact form of support for a wringer together with a simple form of gearing for the wringer, all of which will be clearly set forth herein aided by the accompanying drawing, in which, Figure 1 is an elevation of a tub showing my improved support mounted thereon and a wringer mounted upon the support. Fig. 2 is an elevation of a part of the same as seen from the opposite side. Fig. 3 is a plan of a part of the mechanism shown in Figs. 1 and 2. Fig. 4 is a detail, in elevation, of a locking pin and other parts. Fig. 5 is a detail of portions shown in Fig. 4, and Fig. 6 shows a clutch-operating arm illustrated in Fig. 2.

A represents the tub which carries the wringer support and the gearing for operating said wringer. Secured in any suitable manner to the upper portion of the tub is a bracket B having a horizontally disposed table C clearly illustrated in Fig. 3. The table is centrally provided with a bore D to receive a drive shaft E and its upper surface has a boss F and a reduced portion L, there being a shoulder at G to receive a yoke H that carries the wringer indicated at J. The yoke has a bore K to receive the shaft E and is counterbored to receive the said portion L of the boss F.

The said yoke H comprises two extensions or arms M each forming a bearing for a shaft N. Upon said shaft between the arms M are two beveled gears O facing each other and free to rotate upon said shaft, there being a gear P carried on the upper end of the shaft E which is in mesh with both said gears O.

Q is a clutch sleeve slidably carried on the shaft N and rotatable therewith through any suitable means whereby rotation may be imparted to the shaft N by either gear O when the clutch is thrown in engagement with the same. One end of the shaft N carries a member R in which the lower shaft S of the wringer is held in any suitable manner such as a key T, for example, passing through said member R and the shaft S so that rotation may be imparted to the wringer through said shaft N.

Cast with the yoke H is an arm U comprised in which is a vertical flange V upon which to clamp the wringer in any one of the usual ways, not shown, and a shelf portion W to act as a drain-board. Extending from and cast with one side of the flange V are two ears 2 through which extend two rods 3, 4, extending longitudinally of the arm U. Cast with the arm adjacent said arm U. Cast with the arm adjacent one of the ears 2 or that nearest the tub, is a pair of horizontal flanges 5 which act in a dual capacity: first, to strengthen the arm U, and, second, to act as supports for a locking pin 6, clearly shown in Fig. 4, said pin extending vertically through both of said flanges.

7 indicates a pin extending through the pin 6, and interposed between it and the upper of the flanges is an expanding spring 8 which constantly tends to hold the pin downward with considerable pressure. The upper end of the pin has an arm 9 whose under surface has a series of three notches 10 therein, but two of which are shown, Fig. 4, said arm 9 extending through an eye 11 on an arm 12 as a part of and extending at right angles to said rod 3, see Fig. 5. The opposite end of the rod 3, as shown in Fig. 3, is also bent at right angles at 13 and answers as a lever by which to impart an axial movement to the said rod, it being observed that by rocking the rod in the proper direction the eye 11 of the arm 12 will lift the pin 6 against the pressure of the spring 8.

In the table C is a series of holes 14, Fig. 3, but two of which can be seen in the figure, a third one being shown in Fig. 1. These holes are disposed around the table at desired points and are arranged on a circle described from the axis of the shaft E about which the arm U must swing, and must lie in position to register with the pin 6 of the arm U so that through said pin the arm and wringer may be stationed in any position desired.

The rod 4 previously mentioned has an extension 15 at one end which rises to and engages the clutch-sleeve Q, by passing through an opening 16 in a protecting housing 17 covering and protecting the gearing, and by shifting the said rod endwise the clutch can be carried into engagement with either gear O or it may be moved to a neutral position. Secured to the lower portion of the tub is a bracket 17' acting as a bearing for the lower end of the shaft E said bracket having a boss 18 on its upper surface provided with a reduced portion 19 forming a shoulder 20. The lower end of the shaft carries a beveled gear 21 operated from a gear 22 through any suitable source of power. Cast with the under side of the arm U, or secured thereto by means of suitable bolts 23, is one end of a brace arm 24 having at its lower end a right angled extension including an eye 25 which incloses the reduced portion 19 of the boss 18 and rests upon the shoulder 20. Said arm 24 is curved inwardly or toward the shaft E so that a tub or clothes basket can be placed directly beneath the wringer without being interfered with by the said arm 24 as the arm U swings, and said arm 24 can be extended as far out on the arm U as desired so as to best support the weight of the wringer and parts.

My improved wringer support is simple in construction, strong, very easy to operate, and compact.

The bracket 17' and its boss 18—19 receive the brace arm 24 without requiring extra parts. Furthermore, the boss L on the table C and the boss 18, and 19 just mentioned together with the yoke H and the arm 24 produce a very strong rigid structure throughout.

The construction of the device and the assembling of it is greatly simplified over known structures by casting the said arm U and the yoke H in one integral part.

The means for operating the clutch and the locking pin 6 are within convenient reach at the outer end of the wringer where the operator can readily reach them without changing position at the wringer.

In addition, the parts can all be assembled with little work.

Having described my invention, I claim:—

1. In a device of the class described, a support, an arm pivoted thereon and consisting of a single casting including at one end a shelf-like portion and a vertical flange portion, the latter having a pair of ears at its rear side, said arm at its other or pivoted end including a pair of spaced arms, a shaft journaled in said arms, a pair of gears mounted on said shaft, a shaft extending through the arm at its pivot, a gear thereon in mesh with the said pair of gears, a clutch adapted to engage either of the said pair of gears, and a rod in control of the clutch and carried by the said pair of ears and extending to the outer end of said arm.

2. In a device of the class described, a support, an arm pivoted thereon and consisting of a single casting including at one end a shelf-like portion and a vertical flange portion, the latter having a pair of ears at its rear side, said arm at its other or pivoted end including a pair of spaced arms, a shaft journaled in said arms, a pair of gears mounted on said shaft, a shaft extending through the arm at its pivot, a gear thereon in mesh with the said pair of gears, a clutch adapted to engage either of the said pair of gears, a spring held pin carried by the arm and adapted to engage the bracket, a rod in control of the clutch, and a rod in control of the pin, both said rods being carried in the described pair of ears and extending to the outer end of the said arm.

3. The combination of a support, a pair of brackets mounted thereon, one above the other, and each including a boss on its upper surface, an arm mounted to swing upon the upper of the brackets and provided with a socket to receive the boss of said bracket, and an arm mounted at one end upon the boss of the lower bracket and supporting at its other end the first described arm.

4. In a device of the character described, in combination, a mechanism support including a pair of superimposed brackets, a shaft passing through and having a bearing in said brackets, the upper bracket having a plurality of spaced openings arranged in an arc of a circle, the center of which is said shaft, an arm swingably connected with the upper end of said shaft and formed at its inner end with a yoke having spaced bearings in alinement to receive a driving shaft, the outer and longer portion of said arm adapted to sustain the mechanism, a curved arm connected at its upper end to said swinging arm, and supporting the same, said curved arm having a swingable connection with said shaft, a locking pin carried by said first arm and adapted to enter any one of the openings in said bracket, when in the movement of the arm said pin is brought coincident therewith, and means for actuating said pin.

In testimony whereof I affix my signature, in presence of two witnesses.

MATHIAS PALUSKA, Jr.

Witnesses:
L. M. THURLOW,
L. O. EAGLETON.